US009316761B2

(12) United States Patent
Edwards et al.

(10) Patent No.: US 9,316,761 B2
(45) Date of Patent: Apr. 19, 2016

(54) DETERMINING RESERVOIR CONNECTIVITY USING FLUID CONTACT GRAVITY MEASUREMENTS

(75) Inventors: Carl M. Edwards, Katy, TX (US);
Daniel T. Georgi, Houston, TX (US);
Antonius M. Loermans, Dhahran (SA)

(73) Assignee: BAKER HUGHES INCORPORATED, Houston, TX (US)

( * ) Notice: Subject to any disclaimer, the term of this patent is extended or adjusted under 35 U.S.C. 154(b) by 912 days.

(21) Appl. No.: 13/357,786

(22) Filed: Jan. 25, 2012

(65) Prior Publication Data

US 2013/0191030 A1    Jul. 25, 2013

(51) Int. Cl.
*G01V 7/06*      (2006.01)
*G06F 17/00*    (2006.01)

(52) U.S. Cl.
CPC . *G01V 7/06* (2013.01); *G06F 17/00* (2013.01)

(58) Field of Classification Search
CPC .................................. G01V 7/06; E21B 47/10
USPC .......................................................... 702/12
See application file for complete search history.

(56) References Cited

U.S. PATENT DOCUMENTS

| | | | |
|---|---|---|---|
| 2,787,417 A * | 4/1957 | Northrup et al. ................ 703/10 | |
| 4,507,958 A | 4/1985 | Russell et al. | |
| 5,218,864 A * | 6/1993 | Pennybaker ............. G01V 7/06 | 73/152.05 |
| 6,954,698 B2 | 10/2005 | Tryggvason | |
| 7,069,780 B2 | 7/2006 | Ander | |
| 7,142,985 B2 | 11/2006 | Edwards | |
| 7,793,543 B2 | 9/2010 | Csutak | |
| 8,113,041 B2 | 2/2012 | DiFoggio et al. | |
| 2007/0027666 A1 | 2/2007 | Frankel | |
| 2008/0154505 A1 | 6/2008 | Kim et al. | |
| 2010/0057418 A1 | 3/2010 | Li et al. | |
| 2010/0235154 A1 | 9/2010 | Meurer et al. | |
| 2011/0100632 A1* | 5/2011 | Dinariev et al. ........... 166/305.1 | |
| 2011/0185806 A1* | 8/2011 | Pfutzner ..................... 73/152.54 | |
| 2011/0191027 A1* | 8/2011 | Pfutzner et al. .................... 702/6 | |
| 2013/0173166 A1* | 7/2013 | Badri et al. ...................... 702/12 | |

OTHER PUBLICATIONS

Hadj-Sassi et al., "Three-Dimensional Inversion of Borehole Gravity Measurements for Reservoir Fluid Monitoring", 2010 Presented at the 2010 SPE/DGS Ann. Tech. Symp. and Exhibit. Apr. 4-7, 2010.*
S. W. Hawking, "Quantum gravity and path integrals", 1978, Phys. Rev. D, vol. 18 No. 6.*

(Continued)

*Primary Examiner* — Regis Betsch
(74) *Attorney, Agent, or Firm* — Mossman Kumar & Tyler PC (57) ABSTRACT

An apparatus and method for estimating reservoir connectivity using gravity estimates at a fluid contact for each of two or more boreholes. The method may include identifying fluid contacts in the boreholes. The method may include additional gravity estimates at and/or between a well head and the fluid contact of each borehole. The method may include gravity estimates along a surface between well heads of the boreholes. The method may include estimating true vertical depth for the boreholes. The apparatus may include at least one gravimeter and a processor configured to estimate reservoir connectivity using estimates from the gravimeter.

14 Claims, 6 Drawing Sheets

(56) References Cited

OTHER PUBLICATIONS

Brady et al., "Improved Production Log Interpretation in Horizontal Wells Using a Combination of Pulsed Neutron Logs, Quantitative Temperature Log Analysis, Time Lapse LWD Resistivity Logs and Borehole Gravity", 1998 Presented at the Western Regional Meeting Bakersfield CA May 10-13, 1998.*

Gasperikova et al., "Gravity monitoring of CO2 movement during sequestration: Model studies", 2008 Geophysics vol. 73 No. 6.*

Best, Kevin D., "Development of an integrated model for compaction/water driven reservoirs and its application to the J1 and J2 Sands at Bull Winkle, Green Canyon, Block 65, Deepwater Gulf of Mexico," Thesis of the Graduate School, Pennsylvania State University (May 2002).

* cited by examiner

DETERMINING RESERVOIR CONNECTIVITY USING FLUID CONTACT GRAVITY MEASUREMENTS

BACKGROUND OF THE DISCLOSURE

1. Field of the Disclosure

In one aspect, this disclosure generally relates methods and apparatuses for estimating reservoir connectivity.

2. Background of the Art

In exploration, development, and monitoring related to hydrocarbon production, it is important to make accurate measurements of geologic formations. The geologic formations below the surface of the earth may contain reservoirs of oil and gas. The geologic formations may include formation layers and various structures. In a quest for oil and gas, it is important to know about the location and composition of the formation layers and the various structures. In particular, it is important to know about the geologic formations with a high degree of accuracy so that resources are not wasted. Measuring properties of the geologic formations provides information that can be useful for locating the reservoirs of oil and gas. Generally, the oil and gas are retrieved by drilling boreholes into the subsurface of the earth. The boreholes also provide access for taking measurements of the geologic formations.

Well logging is a technique used to take measurements of the geologic formations from the borehole. In one embodiment, a "logging instrument" is lowered on the end of a wireline into the borehole. The logging instrument sends data via the wireline to the surface for recording. Output from the logging instrument comes in various forms and may be referred to as a "log." Many types of measurements are made to obtain information about the geologic formations. Some examples of the measurements include gamma-gamma density logs, gamma ray logs, nuclear magnetic resonance logs, neutron logs, resistivity logs, and sonic or acoustic logs.

Typically, a common factor among the logs is that a borehole depth is associated with the measurements. For example, each time a resistivity measurement is made, the measurement is associated with the borehole depth at which the measurement was made. In general, many logs of various measurements are analyzed to make an accurate assessment of the geologic formations. The various measurements may be viewed side-by-side to form a composite picture of the geologic formations. Therefore, it is important to have accurate knowledge of the borehole depth and orientation of the logging tool when each measurement is taken.

To develop and manage hydrocarbon reservoirs it is critical to estimate reservoir connectivity. Traditionally formation evaluation measurements are made versus measured depth and then converted to TVD using well inclination data obtained from survey data. Ultimately when comparing fluid contacts from one well with another, cumulative errors in the measured depth that propagate to the computed TVD make it difficult to determine if two contact levels measured in different wells are at the same depth. The inability to determine whether the contact is at the same depth means it is difficult to determine whether the reservoir is compartmentalized and whether additional wells are needed to provide pressure support and to efficiently produce the hydrocarbons. Further, the contact depth (TVD) may be needed to compute the volume of hydrocarbons in a structure, where the structure may be known from a geologic model or surface seismic data. Horizontal offsets of the borehole may also lead to errors in measuring the borehole depth. It is, therefore, important to know the "true vertical depth" of the logging instrument. The horizontal offsets are not relevant to the true vertical depth.

SUMMARY OF THE DISCLOSURE

In aspects, the present disclosure is related to an apparatus and method for estimating reservoir connectivity.

One embodiment according to the present disclosure includes a method for estimating reservoir connectivity in an earth formation, comprising: estimating reservoir connectivity using gravity estimates at a fluid contact in each of at least two boreholes.

Another embodiment according to the present disclosure includes an apparatus for estimating reservoir connectivity, comprising: at least one gravimeter configured for conveyance in at least two boreholes penetrating an earth formation; and at least one processor configured to: estimate reservoir connectivity using gravity estimates at a fluid contact in each of the at least two boreholes.

Another embodiment according to the present disclosure includes a non-transitory computer-readable medium product having instructions thereon that, when read by at least one processor, causes the at least one processor to execute a method, the method comprising: estimating reservoir connectivity using gravity estimates at a fluid contact in at least two boreholes.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

The present disclosure relates to devices and methods for estimating reservoir connectivity. In particular, estimating connectivity between two wells. The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Figure 1:
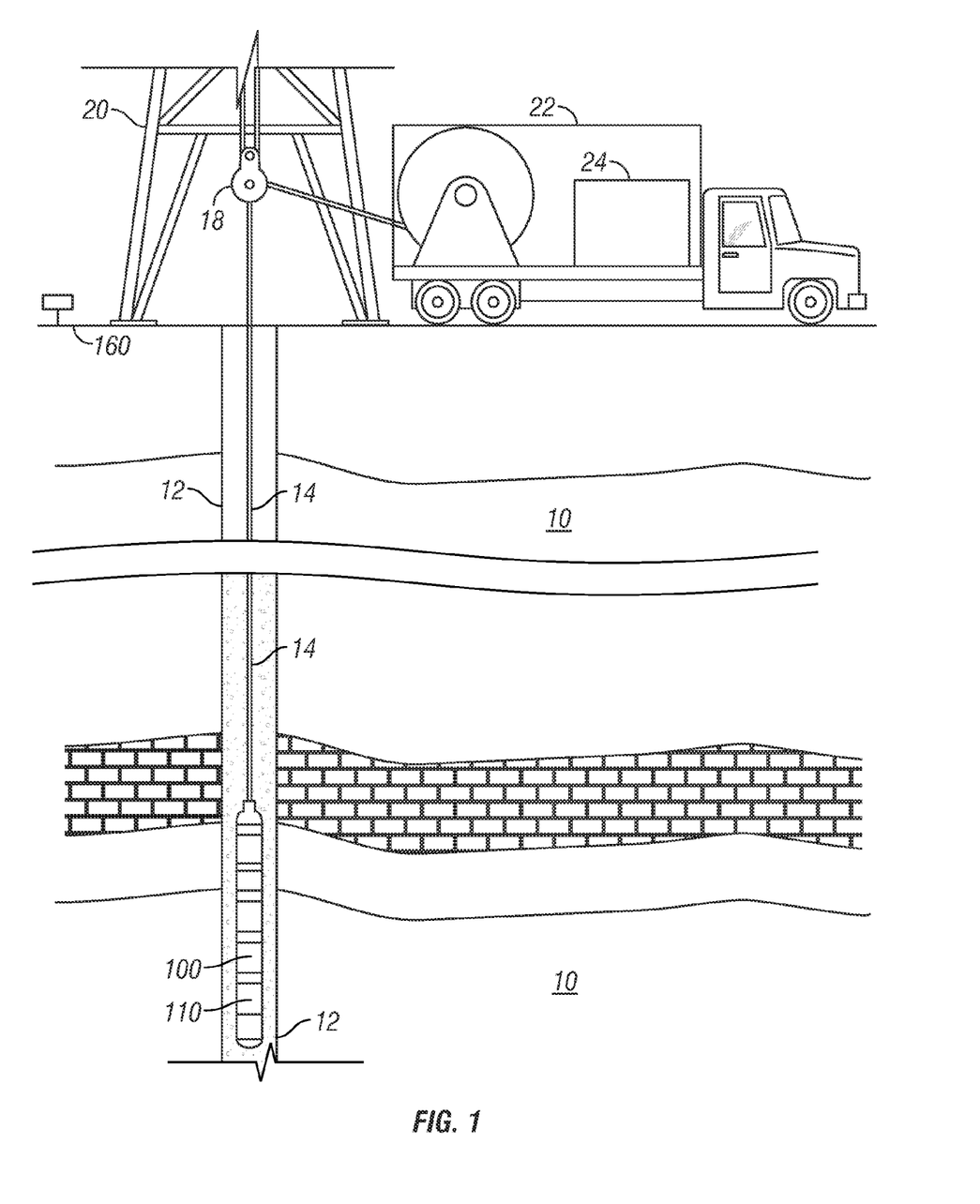
FIG. 1 shows a logging tool with a gravimeter deployed along a wireline according to one embodiment of the present disclosure.

FIG. 1 shows one embodiment according to the present disclosure wherein a cross-section of a subterranean formation 10 in which is drilled a borehole 12 is schematically represented. Suspended within the borehole 12 at the bottom end of a carrier such as a wireline 14 is a device or tool 100. The term "carrier" as used herein means any device, device component, combination of devices, media and/or member that may be used to convey, house, support, or otherwise facilitate the use of another device, device component, combination of devices, media and/or member. Exemplary non-limiting carriers include drill strings of the coiled tube type, of the jointed pipe type, and any combination or portion thereof. Other carrier examples include casing pipes, wirelines, wireline sondes, slickline sondes, drop shots, downhole subs, bottom hole assemblies, drill string inserts, modules, internal housings, and substrate portions thereof. The tool 100 may include an information processing device. Information processing device as used herein means any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals. The wireline 14 may be carried over a pulley 18 supported by a derrick 20. Wireline deployment and retrieval is performed by a powered winch carried by a service truck 22, for example. A control panel 24 interconnected to the tool 100 through the wireline 14 by conventional means controls transmission of electrical power, data/command signals, and also provides control over operation of the components in the device 100. There use of a non-rigid carrier to convey tool 100 is exemplary only. Tool 100 may also be conveyed by a rigid carrier. In some embodiments, the borehole 12 may be utilized to recover hydrocarbons. In other embodiments, the borehole 12 may be used for geothermal applications, water production, mining, tunnel construction, or other uses.

In embodiments, the device 100 may be configured to collect information regarding force or acceleration. The device may also be configured to: (i) actively or passively collect information about the various characteristics of the formation, (ii) provide information about tool orientation and direction of movement, (iii) provide information about the characteristics of the reservoir fluid and/or (iv) evaluate reservoir conditions (e.g., formation pressure, wellbore pressure, temperature, etc.). Exemplary devices may include resistivity sensors (for determining the formation resistivity, dielectric constant and the presence or absence of hydrocarbons), acoustic sensors (for determining the acoustic porosity of the formation and the bed boundary in the formation), nuclear sensors (for determining the formation density, nuclear porosity and certain rock characteristics), and nuclear magnetic resonance sensors (for determining the porosity and other petrophysical characteristics of the formation). Other exemplary devices may include gyroscopes, magnetometers, and sensors that collect formation fluid samples and determine the properties of the formation fluid, which include physical properties and chemical properties.

Tool 100 may be conveyed to a position in operable communication or proximity with a parameter of interest. In some embodiments, device 100 may be conveyed into a borehole 12. Tool 100 may include a gravimeter 110 configured to estimate gravitation acceleration in one or more directions. The gravimeter 110 may include one or more of: (i) a relative gravimeter and (ii) an absolute gravimeter. The gravimeter may include (i) a single axis gravimeter or (ii) a vector gravimeter. The gravimeter 110 may include an interferometric gravimeter. A non-limiting example of an interferometric gravimeter may include a proof-mass on a spring comprises at least one side of at least one Fabry-Perot etalon. A suitable light source may impinge on the etalon and interrogate the etalon's response to acceleration due to gravity. Depending on the operating principle of the tool 100, the tool 100 may be configured to operate under surface and borehole conditions. The ambient temperature in the borehole may exceed 120 degrees Celsius (248 degrees Fahrenheit). In other embodiments, gravimeter 110 from tool 100, may be used at the surface 160.

In some embodiments, tool 100 may include a well logging device configured to detect and/or estimate a fluid contact within the borehole 12. Herein, a fluid contact relates to a free liquid level in an earth formation. The free liquid level may include one or more of: (i) an oil-water contact, (ii) a gas-oil contact, and (iii) a water-gas contact. In some embodiments, estimating the fluid contact may include performing a correction for capillary effects and/or other variances known to those of skill in the art. In other embodiments, well logs may be obtained using a different device or the tool 100 during a separate well evaluation.

Fluid contact in an earth formation may be estimated using a well log information including, but not limited to, one or more of: (i) differential pressure fluid density, (ii) pressure, (iii) water saturation, (iv) NMR fluid identification, (v) dielectric constant, (vi) gamma-gamma fluid density, (vii) pulsed neutron sigma, (viii) fluid capacitance, (ix) mud logging data, and other formation evaluations understood by one of skill in the art. Fluid contact data may be obtained from either open- or cased-hole log data collected with using, but not limited to, one or more of: wireline, slickline memory tools, drill pipe, and coil tubing.

Knowledge of reservoir connectivity is significant for efficient development and management of a reservoir. Gravity estimates may be used in the estimating of reservoir connectivity.

Gravitational acceleration at the fluid contact in a borehole may be compared with gravitational acceleration at other fluid contacts. When gravity estimates are substantially equal in value at fluid contacts in two different boreholes, this may be an indication that both boreholes are in connected reservoirs. Connected reservoirs may be considered portions of a single large reservoir. Likewise, different gravity estimates at fluid contacts in two boreholes may indicate that the borehole do not have reservoir connectivity.

Figure 2:
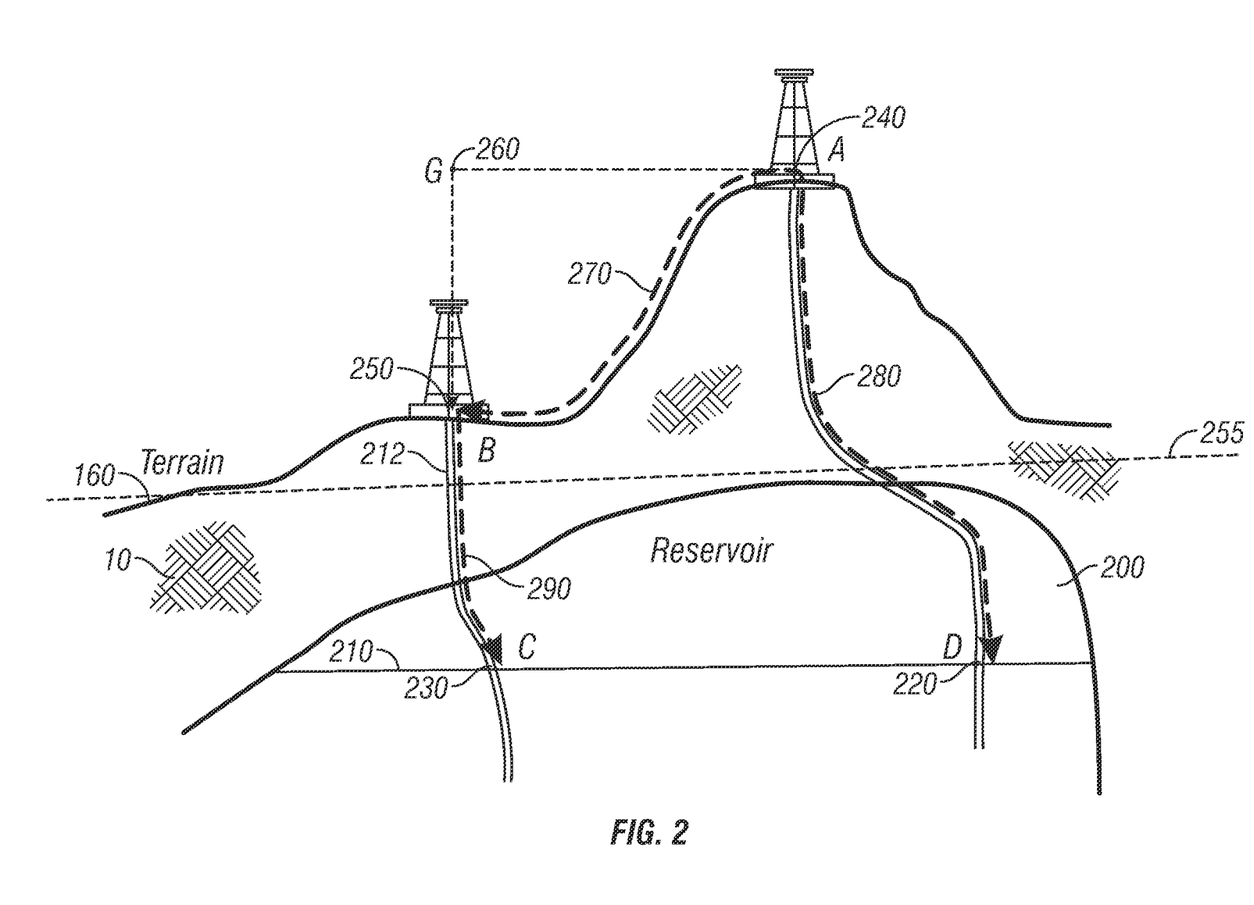
FIG. 2 shows a cross-section of an earth formation with integration paths for one embodiment according to the present disclosure.

Sometimes TVD of one borehole may be compared to a TVD of a second borehole to estimate reservoir connectivity. TVD is a measure of a difference in height between a measurement point and the geoid 255. Herein, the geoid is defined as mean sea level. This means that the earth's gravity vector is normal to surfaces defined by constant TVD. Therefore gas/liquid and liquid/liquid interfaces in hydrocarbon reservoirs may lie on one of these surfaces. Fluid contacts that are at the same true vertical depth from borehole to borehole across a reservoir may indicate reservoir connectivity. This a key piece of information for the efficient development and management of the reservoir.

For locations on the earth's surface, height above/below the geoid 255 may be measured and is usually well known. The situation may be different for locations within earth, such as boreholes. In this case, TVD can be estimated by surveying a borehole using inertial navigation systems. However, the uncertainty in the path of borehole may increase with the length of the borehole and the uncertainty of the estimated TVD increase proportionately. This uncertainty can be large enough to make a determination of reservoir connectivity difficult.

However, subsurface TVD may be estimated without using inertial navigation by making measurements of the earth's gravitational acceleration. A change in TVD (ΔTVD) from the surface to a location in the borehole is related to the density of intervening geological structures and the change in gravitational acceleration, Δg. Specifically, $$\Delta TVD = \Delta g/(F - 0.0419\bar{\rho}), \quad (1)$$

where $\bar{\rho}$ is the average density of the intervening structures in gm/cc; Δg is in mgal ($10^{-3}$ cm/sec$^2$); F, known as the free air gradient, is approximately 0.3086 mGal/m but may vary slightly as a function of location, and ΔTVD is in meters.

The average density along the borehole may be estimated using an average value based on density logging information. A typical average density value may be around 2 to 3 gm/cc. Average density may be estimated by measuring the density near the borehole using standard formation evaluation tools such as gamma-ray attenuation measurements. The average density may then be computed by integrated the measured density along the borehole.

FIG. 2 shows a cross-section of an earth formation 10 with a reservoir 200. A first borehole 12 and a second borehole 212 penetrate the earth formation 10. In this example, both boreholes 12, 212 also penetrate the reservoir 200. Reservoir 200 may have a fluid level 210. Each of the boreholes 12, 212 may intersects the fluid layer 210 at respective fluid contact points 220 and 230. Gravity measurements may be made in the boreholes 12, 212 using the apparatus 100 of FIG. 1. Each borehole 12, 212 may also intersect surface 160 at a point 240, 250, which may be referred to as a well head.

In some embodiments, the change in TVD from well head 240, 250 to the fluid contact 220, 230 may be estimated using the average density of the earth formation 10 along the borehole paths BC (between points 230 and 250) and AD (between points 220 and 240). In addition, the difference in height above the geoid 255 between the wellheads 240 and 250 may be measured using one or more of: (i) a Global Positioning System (GPS), (ii) surveying techniques, and (iii) some other means known to those of skill in the art. TVD of the fluid contact 220, 230 may be estimated at some measured depths along each borehole. In this embodiment, the fluid contact 220, 230 in each borehole 12, 212 is identified using standard formation evaluation techniques and TVDs of these fluid contacts 220, 230 may be compared from borehole 12 to borehole 212 to determine reservoir connectivity. When the TVD for fluid contact 220 in borehole 12 is substantially identical to the TVD of fluid contact 230 in borehole 212, then the boreholes 12, 212 (and the reservoir(s) they penetrate) are likely to have connectivity.

Figure 3A:
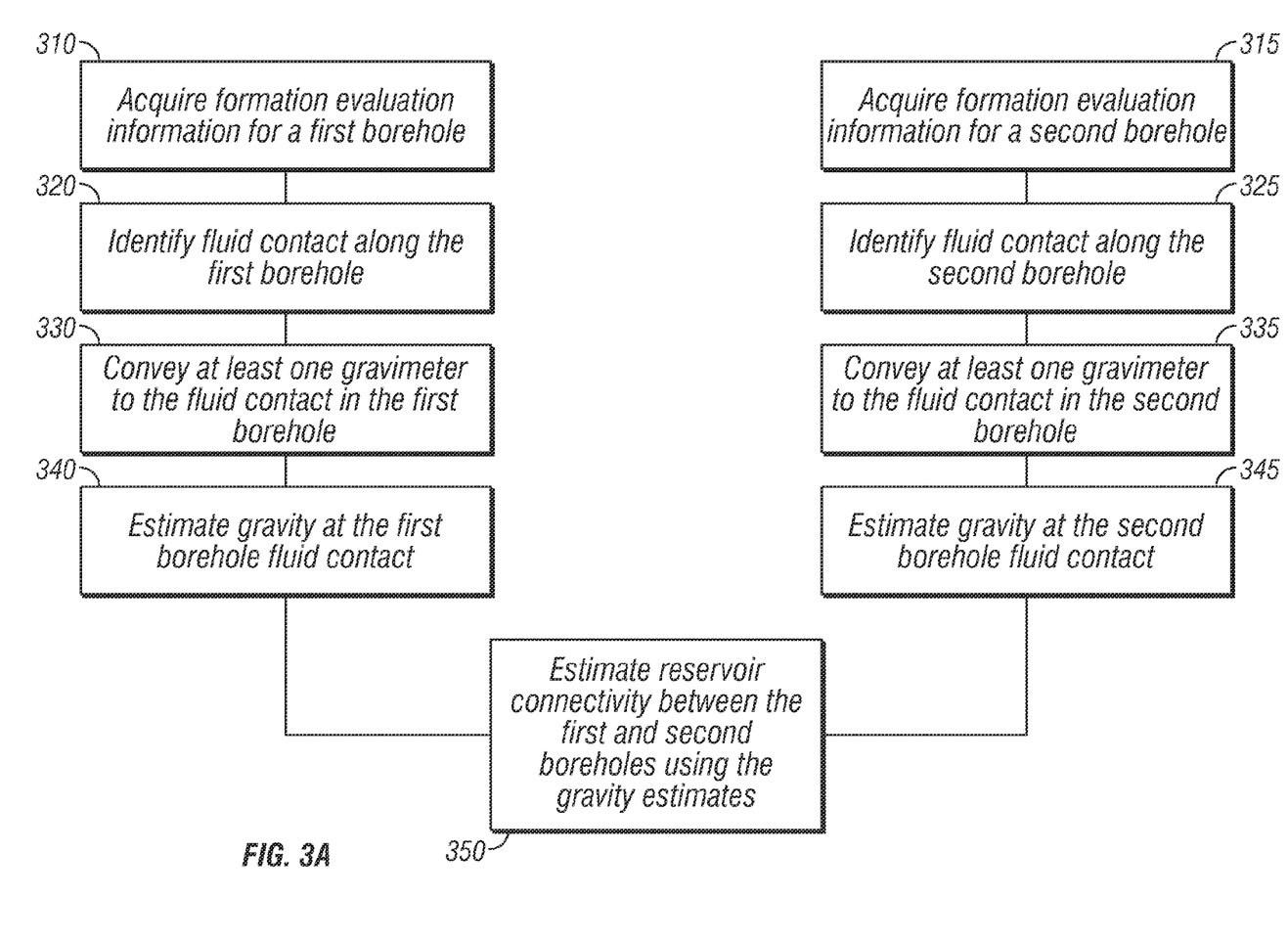
FIG. 3A shows a flow chart of one method for estimating reservoir connectivity using gravity estimates according to one embodiment of the present disclosure.

FIG. 3A shows a flow chart of one embodiment of a method 300 for estimating reservoir connectivity according to the present disclosure. In step 310, a formation evaluation may be performed for first borehole 12. Formation evaluation may include interpreting a well log and/or performing well logging. In step 320, a fluid contact 220 may be identified along first borehole 12 using information from the well log of first borehole 12. In step 330, a gravimeter 110 may be conveyed in first borehole 12 to the fluid contact 220. In step 340, gravitational acceleration may be estimated in the first borehole 12 at the fluid contact 220. Estimating gravitational acceleration may include corrections for earth tides, terrain, other effects known to those skilled in the art, and, especially when comparing different surface locations with the same gravimeter, surface displacement. In some embodiments, gravitational acceleration may be estimated at one or more additional points between and including fluid contact 220 and well head 240. In step 315, a formation evaluation may be performed for second borehole 212. Formation evaluation may include interpreting a well log and/or performing well logging. In step 325, a fluid contact 230 may be identified along second borehole 212 using information from the well log of second borehole 212. In step 335, a gravimeter 110 may be conveyed in second borehole 212 to the fluid contact 230. In step 345, gravitational acceleration may be estimated in the second borehole 212 at the fluid contact 230. In some embodiments, gravitational acceleration may be estimated at one or more additional points between and including fluid contact 230 and well head 250. In some embodiments, steps 310 to 340 and steps 315 to 345 may be performed in parallel. In step 350, reservoir connectivity between reservoir(s) 200 penetrated by boreholes 12 and 212 may be estimated by comparing the estimated gravitation acceleration at fluid contact 240 to the estimated gravitation acceleration at fluid contact 250.

Figure 3B:
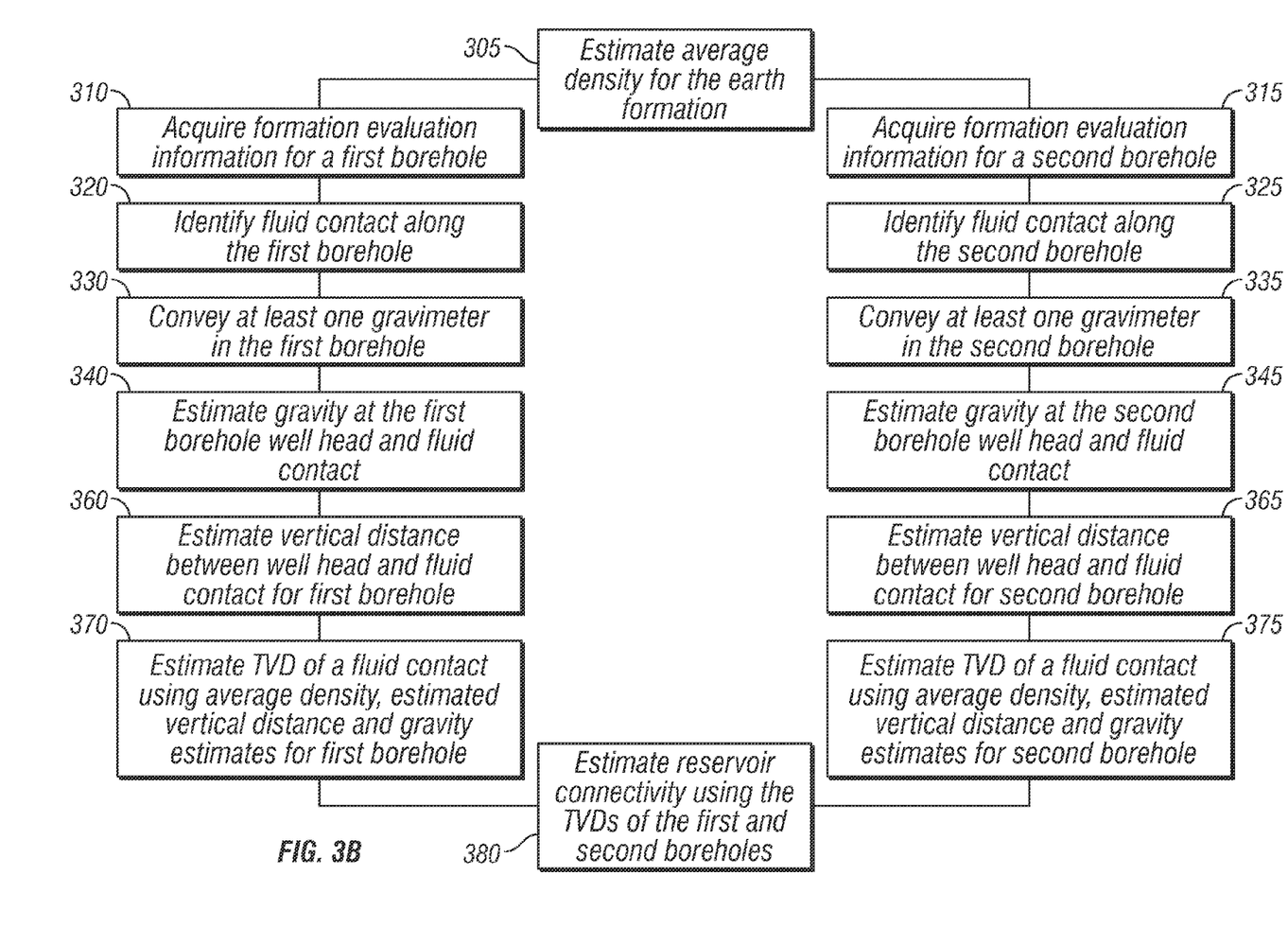
FIG. 3B shows a flow chart of a method for estimating reservoir connectivity using true vertical depth according to one embodiment of the present disclosure.

FIG. 3B shows a flow chart of one embodiment of a method 300 for estimating reservoir connectivity according to the present disclosure. In step 305, the average density of the earth formation 10 is estimated. In step 310, a formation evaluation may be performed for first borehole 12. Formation evaluation may include interpreting a well log and/or performing well logging. In some embodiments, average density of the earth formation may be estimated using the well logs from step 310. In step 320, a fluid contact 220 may be identified along first borehole 12 using information from the well log of first borehole 12. In step 330, tool 100 with gravimeter 110 may be conveyed in first borehole 12. In step 340, gravitational acceleration may be estimated in the first borehole 12 at the well head 240 and fluid contact 220. In some embodiments, the gravity estimate at the well head 240 may be performed prior to the tool 100 being conveyed in step 330. Estimating gravitational acceleration may include corrections for earth tides, terrain, and other effects known to those skilled in the art and, especially when comparing different locations relative to the surface 160 with the same gravimeter 110, surface displacement. In some embodiments, gravitational acceleration may be estimated at one or more additional points between and including fluid contact 220 and well head 240. In step 360, the vertical distance between well head 240 and fluid contact 220 of the first borehole 12 may be estimated. In step 370, the TVD for fluid contact 220 in the first borehole 12 may be estimated using the estimated vertical distance, the estimated average density of the earth formation, and the gravity estimates at fluid contact 220 and well head 240.

In step 315, a formation evaluation may be performed for second borehole 212. Formation evaluation may include interpreting a well log and/or performing well logging. In step 325, a fluid contact 230 may be identified along second borehole 212 using information from the well log of second borehole 212. In step 335, tool 100 with gravimeter 110 may be conveyed in second borehole 212. In step 345, gravitational acceleration may be estimated in the second borehole 212 at the well head 250 and fluid contact 230. In some embodiments, the gravity estimate at well head 250 may be performed prior to the tool 100 being conveyed in step 335. In step 365, the vertical distance between well head 250 and fluid contact 230 of the first borehole 212 may be estimated. In step 375, the TVD of fluid contact 230 in the second borehole 212 may be estimated using the estimated vertical distance, the estimated average density of the earth formation, and the gravity estimates at fluid contact 230 and well head 250. In some embodiments, gravitational acceleration may be estimated at one or more additional points between and including fluid contact 230 and well head 250. In some embodiments, steps 310 to 370 and steps 315 to 375 may be performed in parallel. In step 380, reservoir connectivity between reservoir(s) 200 penetrated by boreholes 12 and 212 may be estimated by comparing estimated TVDs.

Figure 4:
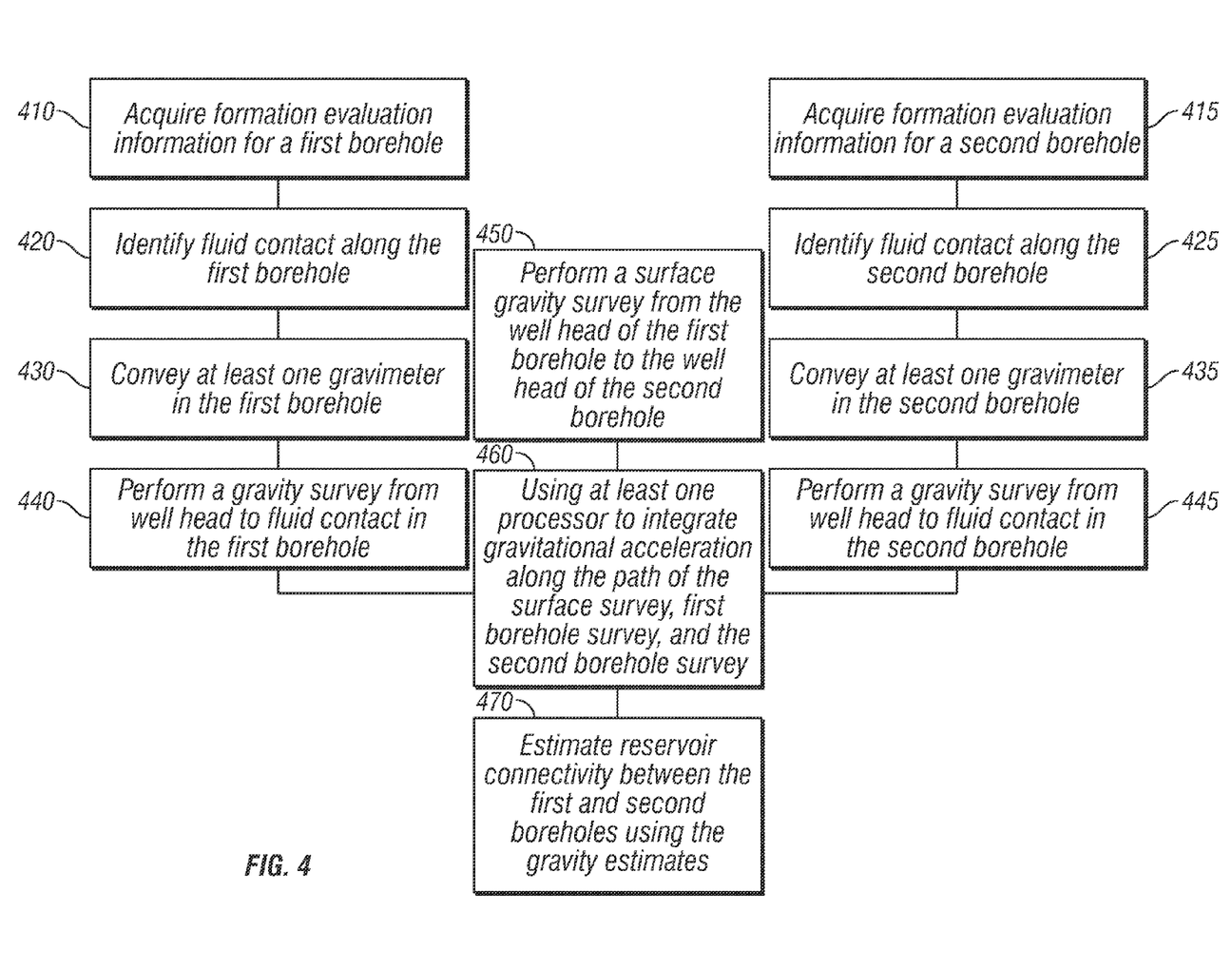
FIG. 4 shows a flow chart of a method for estimating reservoir connectivity using integration over gravity estimates according to one embodiment of the present disclosure.

FIG. 4 shows a flow chart of another embodiment of a method 400 for estimating reservoir connectivity according to the present disclosure. In step 410, a formation evaluation may be performed for borehole 12. Formation evaluation may include interpreting a well log and/or performing well logging. In step 420, a fluid contact 220 may be identified along borehole 12 using information from the well log of borehole 12. In step 430, tool 100 including a gravimeter 110 may be conveyed in the first borehole 12. In step 440, a gravity survey may be performed in borehole 12 between points 220 and 240 using tool 100. In step 415, a formation evaluation may be performed for borehole 212. Formation evaluation may include interpreting a well log and/or performing well logging. In step 425, a fluid contact 230 may be identified along borehole 212 using information from the well log of borehole 212. In step 435, tool 100 including a gravimeter 110 may be conveyed in the second borehole 212. In step 445, a gravity survey may be performed in borehole 212 between points 230 and 250 using tool 100. In step 450, a surface gravity survey may be performed between points 240 and 250. Steps 440 through 450 may be performed in any order and one or more of the steps may be performed in parallel. In some embodiments, tool 100 may include at least gravimeter 110. The at least one gravimeter 110 may be configured for at least one of: (i) relative gravimetry, (ii) absolute gravimetry, (iii) single-axis gravimetry, (iv) vector gravimetry, and (v) interferometric gravimetry. In step 460, at least one processor may estimated an integrated gravitational acceleration using the gravity surveys along a path from point 220 to point 240 to point 250 to point 230. In step 470, reservoir connectivity between the reservoirs penetrated by borehole 12 and borehole 212 may be estimated using the result of the estimated gravitational acceleration integration.

Performance of the gravity surveys in steps 440 to 450 may be adjusted based on the type of gravimeter used. For example, in one non-limiting embodiment using a relative gravimeter, gravity estimates may be made at several sites (depths) in the first borehole 12 including the surface in well (well head 220). Some of these estimates may be repeated in order to estimate instrument drift of tool 100. Additionally, tool 100 may be transported to borehole 212 without recalibration and a similar set of measurements are made. Assuming that no tares have occurred, then the gravimeter readings at the fluid contacts 230 and 220 should be substantially equal if the reservoir accessed by each of the boreholes 12, 212 is connected.

If a tare occurred during the measurement process, then compensation may be made by repeating measurements at locations before and after the tare has occurred. In this way, measurements before and after the tare can be compensated for by adding a constant term to the drift terms. Once the compensation has taken place, then the compensated readings at the fluid contacts 230 and 220 should be substantially equal provided the reservoir is connected.

Additionally, at least two relative gravimeters may be used if the estimates are performed at the same locations either on the surface or in the borehole such that the readings from the two gravimeters are tied to the same value of gravitational acceleration. For example, a first gravimeter 110 may be used borehole 212 with one measurement location being at the well head 250. A second gravimeter 110 can be used in borehole 12 with a measurement being made at the well head 240. A third relative gravimeter 110 may be used to perform at least one measurement at each well head 240 and 250. The relative value of the measurements may then be adjusted in each well using the collocated measurements of the third gravimeter at the surface 160. This surface gravimeter may be either a relative or absolute gravimeter.

Method 400 takes advantage of the fact that acceleration of gravity is conservative. That means $\vec{g}$ can be derived from a potential field.

$$\vec{g} = -\nabla \phi_g. \tag{2}$$

One consequence of this is that the integral of gravitational acceleration over any closed path is zero, $$\oint \vec{g} \cdot d\vec{r} = 0. \tag{3}$$

An alternate statement of eqn. (3), is that the integral along any open path is independent of path. Thus in FIG. 2, the integral of $\vec{g}$ along a surface path 270 between points 240 to 250 is equal to the integral along a path formed from point 240 to point 260 to point 250.

On the surface, the direction of gravity relative to the path 270 may be estimated either by using a vector gravimeter or by rotating a single-axis gravimeter to achieve a maximum signal and noting the angle between the measurement and the path 270. On the surface, GPS or GPS-assisted inertial navigation techniques may be used to estimate the angle of path 270.

For subsurface measurements, the gravimeter 110 may be conveyed in tool 100. The paths 280, 290 correspond to the boreholes 12, 212. The logging tool 100 generally has a cylindrical shape in which its diameter is much smaller than its length. With the proper orientation devices, the cylindrical axis of the tool will generally be tangent to the borehole. If a vector gravimeter is fixed with respect to the tool, then only the estimate for gravity is needed for the integration. If a single-axis gravimeter is used, then the angle with respect to the tool's cylindrical axis at which the maximum gravitational acceleration occurs may be measured separately.

Having made the gravity surveys and identified the fluid contacts 220, 230 in the boreholes 12, 212, the net gravitation acceleration along a path 280-270-290 from fluid contact 220 to fluid contact 230 may be estimated. The connectivity of the reservoir 200 may be estimated by comparing the path integrals. Using eqn. (3), the integration may be expressed as $$\int_{AB} \vec{g} \cdot d\vec{r} + \int_{BC} \vec{g} \cdot d\vec{r} + \int_{CD} \vec{g} \cdot d\vec{r} + \int_{DA} \vec{g} \cdot d\vec{r} = 0. \tag{4}$$

where A is point 240, B is point 250, C is point 230, and D is point 220.

If the fluid contacts are have the same gravitational potential (and hence the same TVD), then $\vec{g}$ is perpendicular to the path CD and $$\vec{g} \cdot d\vec{r} = 0 \qquad (5)$$

everywhere along path CD. Therefore, if the fluid contacts are at the same TVD, eqn. (4) may be reduced to $$\int_{AB} \vec{g} \cdot d\vec{r} + \int_{BC} \vec{g} \cdot d\vec{r} = \int_{AD} \vec{g} \cdot d\vec{r}. \qquad (6)$$

Note that the integration path from D to A has been reversed.

Method 400 compares the integrals of $\vec{g}$ along the well paths and adjusts one of them for the path between well heads 240, 250 on the surface 160. If the integrals are substantially equal, the fluid contacts 220, 230 (or any other features) are at the same TVD. The same TVD suggests that the reservoir of the first borehole 12 is connected to the reservoir of the second borehole 212. If the integrals are not substantially equal, then the fluid contacts 220, 230 are not at the same level.

Figure 5:
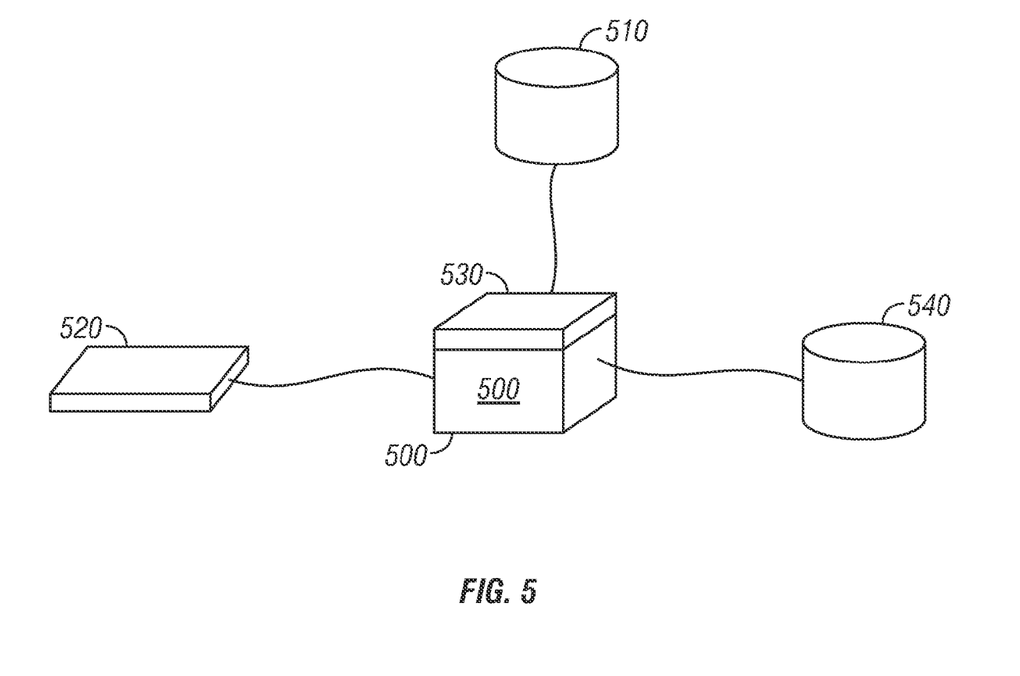
FIG. 5 shows a schematic of an apparatus for implementing one embodiment of the method according to the present disclosure.

As shown in FIG. 5, certain embodiments of the present disclosure may be implemented with a hardware environment that includes an information processor 500, an information storage medium 510, an input device 520, processor memory 530, and may include peripheral information storage medium 540. The hardware environment may be in the well, at the rig, or at a remote location. Moreover, the several components of the hardware environment may be distributed among those locations. The input device 520 may be any information reader or user input device, such as data card reader, keyboard, USB port, etc. The information storage medium 510 stores information provided by the detectors. Information storage medium 510 may be any non-transitory computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 510 stores a program that when executed causes information processor 500 to execute the disclosed method. Information storage medium 510 may also store the formation information provided by the user, or the formation information may be stored in a peripheral information storage medium 540, which may be any standard computer information storage device, such as a USB drive, memory stick, hard disk, removable RAM, or other commonly used memory storage system known to one of ordinary skill in the art including Internet based storage. Information processor 500 may be any form of computer or mathematical processing hardware, including Internet based hardware. When the program is loaded from information storage medium 510 into processor memory 530 (e.g. computer RAM), the program, when executed, causes information processor 500 to retrieve detector information from either information storage medium 510 or peripheral information storage medium 540 and process the information to estimate a parameter of interest. Information processor 500 may be located on the surface or downhole.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

While the foregoing disclosure is directed to the one mode embodiments of the disclosure, various modifications will be apparent to those skilled in the art. It is intended that all variations within the scope of the appended claims be embraced by the foregoing disclosure.

We claim:

1. A method for estimating reservoir fluid connectivity in an earth formation, comprising:
    measuring estimates of gravity along a path using at least one gravimeter, wherein the path includes a fluid contact in each of at least two boreholes, wherein each of the at least two boreholes comprises a well head, and wherein measuring the estimates of gravity along the path comprises:
        conveying the at least one gravimeter to the fluid contact in each of at least two boreholes, and
        performing a surface gravity survey between each well head of the at least two boreholes;
    integrating gravitational acceleration over the path using the measured gravity estimates;
    estimating reservoir fluid connectivity using the measured gravity estimates at the fluid contact in each of the at least two boreholes by determining if a fluid layer intersects the fluid contacts by comparing the integrals of gravitational acceleration over the path; and
    evaluating the earth formation using the estimated reservoir fluid connectivity.

2. The method of claim 1, wherein the at least one gravimeter is configured for at least one of: (i) single-axis gravimetry, (ii) vector gravimetry, (iii) relative gravimetry, (iv) absolute gravimetry, and (v) interferometric gravimetry.

3. The method of claim 1, further comprising:
    estimating a depth of a fluid contact in the at least two boreholes using well logs.

4. The method of claim 3, wherein the well logs include information on at least one of: (i) differential pressure fluid density, (ii) pressure, (iii) water saturation, (iv) NMR fluid identification, (v) dielectric constant, (vi) gamma-gamma fluid density, (vii) pulsed neutron sigma, and (viii) fluid capacitance.

5. The method of claim 1, further comprising:
    estimating a true vertical depth of the fluid contact for each of the at least two boreholes; and
    comparing the true vertical depth of the fluid contact of a first borehole of the at least two borehole with the true vertical depth of the fluid contact of a second borehole of the at least two boreholes.

6. The method of claim 5, wherein estimating the true vertical depth of the fluid contact of each of the at least two boreholes comprises:
    using the at least one gravimeter to estimate gravity at a well head of each of the at least two boreholes;
    using an estimated average density of the earth formation; and
    using a vertical distance between the well head and the fluid contact of each borehole and the gravity estimates for the well head and the fluid contact of each of the at least two boreholes.

7. The method of claim 6, further comprising:
estimating the vertical distance between the well head and the fluid contact in each of the at least two boreholes.

8. The method of claim 6, further comprising:
estimating an average density of the earth formation.

9. The method of claim 1, comprising:
wherein the at least two boreholes includes a first borehole and a second borehole, and the path is formed by: (i) a segment along the first borehole from the fluid contact to the well head of the first borehole, (ii) a segment along the surface of the earth from the well head of the first borehole to a well head of the second borehole, and (iii) a segment along the second borehole from the well head of the second borehole to the fluid contact.

10. An apparatus for estimating reservoir fluid connectivity, comprising:
at least one gravimeter configured for conveyance in at least two boreholes penetrating an earth formation, wherein each of the at least two boreholes comprises a well head;
and
at least one processor configured to:
measure estimates of gravity along a path using the at least one gravimeter, wherein the path includes at least a fluid contact in each of the at least two boreholes, and wherein measuring the estimates of gravity along the path comprises:
conveying the at least one gravimeter to the fluid contact in each of at least two boreholes, and
performing a surface gravity survey between each well head of the at least two boreholes;
integrating gravitational acceleration over the path using the measured gravity estimates;
estimate reservoir fluid connectivity using the measured gravity estimates at the fluid contact in each of the at least two boreholes by determining if a fluid layer intersects the fluid contacts by comparing the integrals of gravitational acceleration over the path; and
evaluate the earth formation using the estimated reservoir fluid connectivity.

11. The apparatus of claim 10, wherein the at least one gravimeter includes a gravimeter configured for surface gravity estimates.

12. The apparatus of claim 10, wherein the at least one gravimeter is configured for at least one of: (i) single-axis gravimetry, (ii) vector gravimetry, (iii) relative gravimetry, (iv) absolute gravimetry, and (v) interferometric gravimetry.

13. A non-transitory computer-readable medium product containing instructions thereon that, when read by at least one processor, causes the at least one processor to execute a method, the method comprising:
measuring estimates of gravity along a path using at least one gravimeter, wherein the path includes a fluid contact in each of at least two boreholes, wherein each of the at least two boreholes comprises a well head, and wherein measuring the estimates of gravity along the path comprises:
conveying the at least one gravimeter to the fluid contact in each of at least two boreholes, and
performing a surface gravity survey between each well head of the at least two boreholes;
integrating gravitational acceleration over the path using the measured gravity estimates;
estimating reservoir fluid connectivity using the measured gravity estimates at the fluid contact in the at least two boreholes by determining if a fluid layer intersects the fluid contacts by comparing the integrals of gravitational acceleration over the path; and
evaluating the earth formation using the estimated reservoir fluid connectivity.

14. The non-transitory computer-readable medium product of claim 13 further comprising at least one of: (i) a ROM, (ii) an EPROM, (iii) an EEPROM, (iv) a flash memory, and (v) an optical disk.

* * * * *